(12) United States Patent
Kohlhase et al.

(10) Patent No.: US 6,684,500 B1
(45) Date of Patent: Feb. 3, 2004

(54) HIGH SPEED MILLING AND TURNING/ TURN BROACHING/TURNING AND TURN BROACHING

(75) Inventors: Matthias Kohlhase, Schramberg-Sulgen (DE); Rolf Santorius, Uhingen-Nassachmuehle (DE)

(73) Assignee: Boehringer Werkzeugmaschinen GmbH, Goepplingen (DE)

( * ) Notice: Subject to any disclaimer, the term of this patent is extended or adjusted under 35 U.S.C. 154(b) by 0 days.

(21) Appl. No.: 09/554,249

(22) PCT Filed: Nov. 11, 1998

(86) PCT No.: PCT/EP98/07232

§ 371 (c)(1),
(2), (4) Date: Jan. 18, 2000

(87) PCT Pub. No.: WO99/24196

PCT Pub. Date: May 20, 1999

(30) Foreign Application Priority Data

Nov. 11, 1997 (DE) .......................... 197 49 939

(51) Int. Cl.$^7$ ................................ B23P 17/00
(52) U.S. Cl. ............. 29/888.08; 29/888.1; 29/558; 409/132
(58) Field of Search .................. 29/888.08, 557, 29/558, 6.01, 888.1, 418, 27 R; 219/121.6; 451/49; 409/199, 132, 131, 244, 262; 82/106

(56) References Cited

U.S. PATENT DOCUMENTS

| 4,635,340 | A | * | 1/1987 | Link |
| 4,867,810 | A | * | 9/1989 | Novorsky |
| 5,078,556 | A |   | 1/1992 | Schrod et al. |
| 5,725,339 | A | * | 3/1998 | Yoshita |
| 5,765,270 | A | * | 6/1998 | Schrod et al. |
| 5,984,599 | A | * | 11/1999 | Janssen |
| 5,997,452 | A | * | 12/1999 | Assie |
| 6,012,883 | A | * | 1/2000 | Engwall et al. |
| 6,050,757 | A | * | 4/2000 | Gesell |
| 6,283,687 | B1 | * | 9/2001 | Santorius et al. |
| 6,322,300 | B1 | * | 11/2001 | Santorius et al. |

FOREIGN PATENT DOCUMENTS

| DE | 204 106 | 11/1983 |
| EP | 0523573 A1 | 1/1993 |
| FR | 1 403 313 | 5/1965 |
| WO | WO 91/14799 | 10/1989 |

* cited by examiner

Primary Examiner—Charles T. Jordan
Assistant Examiner—T. Nguyen
(74) Attorney, Agent, or Firm—Crowell & Moring LLP (57) ABSTRACT

A method and apparatus for machining workpieces with rotationally symmetrical surfaces, for example crankshafts, by which the setting and idle times are minimised, transposition of the workpiece to another machine is avoided, and both large batch sizes and also small numbers of items are economically machined. Machining of the workpiece is effected both by a method in which the machining speed is produced primarily by the rotation of the workpiece, and also by a method in which the machining speed is achieved primarily by the rotation of the tool.

16 Claims, 5 Drawing Sheets

HIGH SPEED MILLING AND TURNING/ TURN BROACHING/TURNING AND TURN BROACHING

BACKGROUND AND SUMMARY OF THE INVENTION

This application claims the priority of German Application No. 19749939.2, filed Nov. 11, 1997, the disclosure of which is expressly incorporated by reference herein.

The invention concerns a method of machining workpieces with rotationally symmetrical surfaces, for example unstable workpieces of a complicated shape, with rotationally symmetrical, even eccentric surfaces, and apparatus for such a machining procedure.

Machining is used in this specification broadly, embracing not just chip-cutting machining but also for example water jet cutting, laser cutting, laser hardening, heat treatment and so forth.

A typical representative of such a workpiece is a crankshaft used for reciprocating piston internal combustion engines, reciprocating piston compressors and so forth, or a camshaft for similar uses.

Machining of a crankshaft in the rough condition, that is to say cast or forged, consisting of steel or cast iron, is generally effected by known cutting machining procedures. Crankshafts are most frequently used in an internal combustion engine of a motor vehicle, and are generally produced in very large numbers. Therefore, in terms of selecting the machining method and the machine configuration, the method which has the expectation of the shortest possible machining time for each crankshaft is adopted.

In accordance with the known procedures, the central or main bearings of the crankshaft are machined by means of rotational broaching or turning-rotational broaching, for example as disclosed in German Patent DE 35 23 274 C2 or European Patent EP No 86 108 666, while the crank throw or big-end bearings and is possibly also the crank side cheek faces can be machined by means of external milling, in particular high-speed external milling, for example as disclosed in German Patent DE 196 26 627 A1, or by means of internal milling, also referred to as spinning cutting, or by means of rotary milling, for example as disclosed in German Patent DE 44 46 475.

As an alternative to external milling it, is also possible to use rotary milling. Under some circumstances the respective cutting machining operation takes place when the workpiece is in an already hardened condition. In that respect the terms just used are employed to denote the following:

Rotational Broaching:

Arranged at the periphery of a disk-shaped tool, spaced in the peripheral direction thereof, are rotational broaching cutting edges whose spacing increases relative to the center of the rotational disk-shaped tool. That disk-shaped tool rotates with its axis in parallel relationship beside the axis of the crankshaft and material is removed at the peripheral surface of the crankshaft by the rotational broaching cutting edges being pivoted along the periphery of the crankshaft which is rotating substantially faster (about 1000 rpm). If the rotational broaching cutting edges are all at the same spacing relative to the center of the tool, a feed must be implemented radially with respect to the crankshaft, in the X-direction, between the tool cutting edges. Those procedures can be distributed to a plurality of cutting edges or can be supplemented by sister tools.

Turning-rotational Broaching:

This involves the rotational broaching operation described above, wherein implemented prior thereto is a plunge-cut turning operation which is implemented by means of a cutting edge which is also arranged on the periphery of the disk-shaped tool. Plunge-cut turning is effected by a procedure whereby the disk-shaped tool does not rotate during engagement of the cutting edge, but is only moved radially forwardly towards the workpiece.

External Milling:

In this case also the cutting edges are disposed on the periphery of a disk-shaped tool which is drivable in rotation with an axis parallel to the axis of the workpiece. The cutting speed however results primarily from the rotary movement of the tool while the workpiece only rotates at about 10 rpm until an at least complete rotary movement of the tool has been completed about the rotationally symmetrical surface of the workpiece, which is to be machined.

Particularly when dealing with large oversizes, a number of passes of the tool around the workpiece surface are required, but even if a single pass seems adequate by virtue of the oversize involved, more than one complete rotary pass is often necessary because of the tangential inward and outward movement of the tool.

The disk-shaped tool is equipped with milling teeth over its entire periphery.

The spacing of the cutting edges in the peripheral direction relative to each other can possibly be less than in the case of rotational broaching or turning-rotational broaching, in regard. to which the intention is generally to conclude the machining operation with the one cutting edge before the next cutting edge comes into the condition of engagement into the workpiece.

Disk-shaped Tool:

This generally involves a circular disk. Theoretically however it is also possible to use non-circular disks, for example ellipses and so forth. Preferably however the disks only ever exhibit convexly outwardly curved peripheral contours and in that respect in particular do not have any hard or abrupt steps in the peripheral contour. If there are cavities in the peripheral contour, they are not equipped with cutting edges.

Rotary Milling:

In contrast to external milling, rotary milling is operated with a generally finger-shaped milling cutter whose axis of rotation is in orthogonal relationship with the axis of rotation of the workpiece to be machined. The peripheral surfaces are machined with the one or more end cutting edges of such a finger milling cutter, and the end faces of the workpiece are milled with the cutting edges arranged on the peripheral surface of the finger cutter.

High-speed Milling (Rotary Milling or External Milling):

This milling occurs at a cutting speed of, for example, in the case of steel: over 130 m/min, in particular over 180 m/min, in the case of cast iron: over 150 m/min, in particular over 200 m/min, and in the case of aluminum: over 300 m/min, in particular over 500 m/min. Such cutting speeds are promoted in particular by a positive cutting edge geometry and the appropriate cutting material choice.

This high cutting speed is advantageous because it minimises all the disadvantages of interrupted cutting, which are inherent in the milling system.

In the prior art, machining operations involving turning/ rotational broaching/turning-rotational broaching on the one hand and machining by means of external milling or rotary milling, that is to say generally milling, on the other hand, were not used in combination as it was considered to be impractical by virtue of the completely different necessary ranges of rotary speed for the workpiece. While, in the case of turning/rotational broaching/turning-rotational broaching, the cutting speed was primarily attained on the basis of the speed of rotation of the workpiece which is about 1000 rpm for a private automobile crapkshaft, and the disk-shaped tool was pivoted in or rotated only at a speed of less than 30 rpm, the situation is approximately diametrally opposite in the case of external milling/rotary milling, in particular in the case of high-speed milling.

In a corresponding fashion the problems which occur in such machining procedures also arise in completely different areas:

In the case of turning/rotational broaching/turning-rotational broaching, it is not necessary to use the C-axis which involves monitoring the rotational position of the workpiece because of the high speed of rotation of the workpiece. Furthermore, co-ordinated tracking, of the tool in the X-direction is in any case not possible with that speed.

The main difficulties with the high speeds of rotation involved include the area of the clamping force, compensating for unbalance and so forth.

By contrast, with external milling/rotary milling, as inter alia the crank throw or big-end bearings are to be machined hereby, implementation of the C-axis is an absolute necessity. The problems lie in sufficiently rigidly clamping or supporting the workpiece and in holding the large heavy workpiece only on one side in a stable and accurate fashion. Particularly when high levels of accuracy are involved, a problem arises with true running and balanced condition of the tool and the tool shaft.

An object of the present invention is to provide a method for machining workpieces with rotationally symmetrical, or even eccentric surfaces such as camshafts or crankshafts, which provides for minimizing the setting and idle times, wherein, in particular, transposition of the workpiece on to another machine by changing the chucking mounting thereof is avoided, and wherein both large and small batch sizes are economically machined.

Another object of the invention is to provide apparatus for machining workpieces, such as crankshafts, which affords enhanced use versatility with a simplified and rational operating procedure.

The foregoing and other objects are attained by the method and apparatus according to the invention as set forth herein.

As will be apparent from the following description of preferred embodiments of the invention, by virtue of the fact that two procedures which are different in principle, as regards the effect of the relative speed between the tool and the workpiece, are used on the workpiece, the machining mode which is the most advantageous both technically and also economically can be selected for the respective operating location and thus considered in its totality over the workpiece. If the two procedures are applied on one and the same machine, considerable setting and idle times for transposition of the workpiece onto another machine, as well as the machining inaccuracies which are caused by re-chucking the workpiece on the other machine can be avoided.

Preferably the workpiece is also not completely released and then clamped again within the machine, but, if possible, the clamping or chucking action is only temporarily released on one side of the crankshaft.

It is thus possible to machine, for example, the central or main bearings of a crankshaft by rotational broaching or turning-rotational broaching, and obviously also by simple turning, while the crank throw bearings, under some circumstances in the same clamping condition, can be machined by means of external milling or rotary milling, and likewise the crankshaft side cheek faces.

Additionally, if there is the possibility of accommodating the crankshaft between points or centers and applying the torque necessary for the machining operation, then the end flange and the end journal of the crankshaft can be machined within the same machine, preferably by means of turning or rotational broaching or turning-rotational broaching, in order to implement clamping of the crankshaft by means of clamping jaws at the periphery thereof, at those surfaces which have then already been machined.

Chucks which are particularly suitable for this purpose have clamping jaws which engage the periphery of the workpiece which can be axially advanced and retracted relative to the point or the center which is guided at the center, namely a tailstock center. This enables a transition received between centers to be clamped at the periphery by means of clamping jaws, and even hybrid forms of those two options.

Preferably the tool units are also displaceable in the Y-direction and possibly also rotatable about the B-axis while there can also be additional boring and milling units on a tool support.

For that purpose a suitable machine preferably has clamping chucks which have both clamping points or centers and also clamping jaws. In this structure, the points are displaceable relative to the jaws in the axial direction, that is to say the Z-direction, in such a way that, upon clamping between points, the jaws, which are then retracted, do not impede machining at the periphery of the end journal and the end flange.

Such a machine has two machining units of which one permits the machining process of turning or rotational broaching or turning-rotational broaching or a combination thereof, while the other permits external milling or rotary milling, in particular at high speed. Those two machining units are arranged in particular on separate or separately actuatable supports which are displaceable at least in the X-direction, preferably also in the Y-direction, and possibly rotatable about the B-axis.

The machining units can each be. arranged on the same side of the workpiece or on opposite sides or at an angle relative to each other. In addition the tool units must also be displaceable in the Z-direction along the workpiece in order to be able to implement their machining procedure at different axial positions of the workpiece.

In addition to or instead of using one of the machining units, it is possible to provide a non-chip-cutting machining unit. This can be a water jet cutting device, a laser cutting device or a device for heat treatment, in particular a laser hardening device. Such a non-chip-cutting machining unit is also preferably displaceable in the Z-direction, possibly also in the X- and the Y-direction.

A movement in the X-direction is however not absolutely necessary depending on the respective machining method involved because, instead of a change in the radial spacing between the tool unit and the workpiece, for example in the case of a laser, it is only necessary to adjust the focusing. A similar procedure is also possible in the case of water jet cutting.

This combination of machining methods or machining units affords the possibility of producing even very small batch sizes and individual items of a given crankshaft at a still viable price. Therefore it is immaterial that the machining time in this case is a multiple of the machining time in the case of large-scale mass production of crankshafts.

Hardening in the machine, for example, by means of a laser beam or an inductor, for particularly the bearing surfaces, can also be used because it is possible to avoid releasing the workpiece, passing it through a separate hardening procedure and re-clamping the crankshaft in another machine in which the post-machining operation after hardening, in particular grinding, is completed. In addition, the hardening operation is effected only at locations where it is required, so that the heat-induced distortion, which occurs in the crankshaft, can be minimized or controlled in a deliberate and targeted fashion, insofar as given regions of the crankshaft are subjected to the heating and cooling effect in a given fashion in terms of magnitude, time sequence and time pattern.

A further advantage of hardening, for examples by means of a laser beam within the machine is that, even during the heating of regions of the crankshaft, which is required for the hardening procedure, by means of a laser beam, cutting machining is possible in those heated regions by means of one of the above-mentioned procedures. This drastically reduces the forces that occur in the cutting machining operation. In that respect the cutting machining procedure can also take place in the cooling period or can extend into, the cooling period so that, during simultaneous cooling, and cutting machining, the thermally induced distortion in the final product can be kept at a minimum level.

In order to be able to implement the extremely different speeds of rotation of the spindle stock or stocks for driving the workpiece, as are necessary with the two groups of the method, these drives may have for example, aside from a motor spindle or motor, an intermediate transmission which can be shifted or which can be brought into operation and which may have a step-up ratio or step-down ratio of the order of magnitude of at least 1:50, particularly 1:70, and preferably 1:100. Implementation of the C-axis on the spindle stock which only has to be involved in the slower mode of operation can also be coupled to the shiftable intermediate transmission. The transmission may be a worm gear/worm assembly or a planetary assembly.

Other objects, advantages and novel features of the present invention will become apparent from the following detailed description of the invention when considered in conjunction with the accompanying drawings.

BRIEF DESCRIPTION OF THE DRAWINGS

Further objects, features and advantages according to the invention will be apparent in greater detail from the description hereinafter of preferred embodiments.

DETAILED DESCRIPTION OF THE PREFERRED EMBODIMENT

Figure 1A:
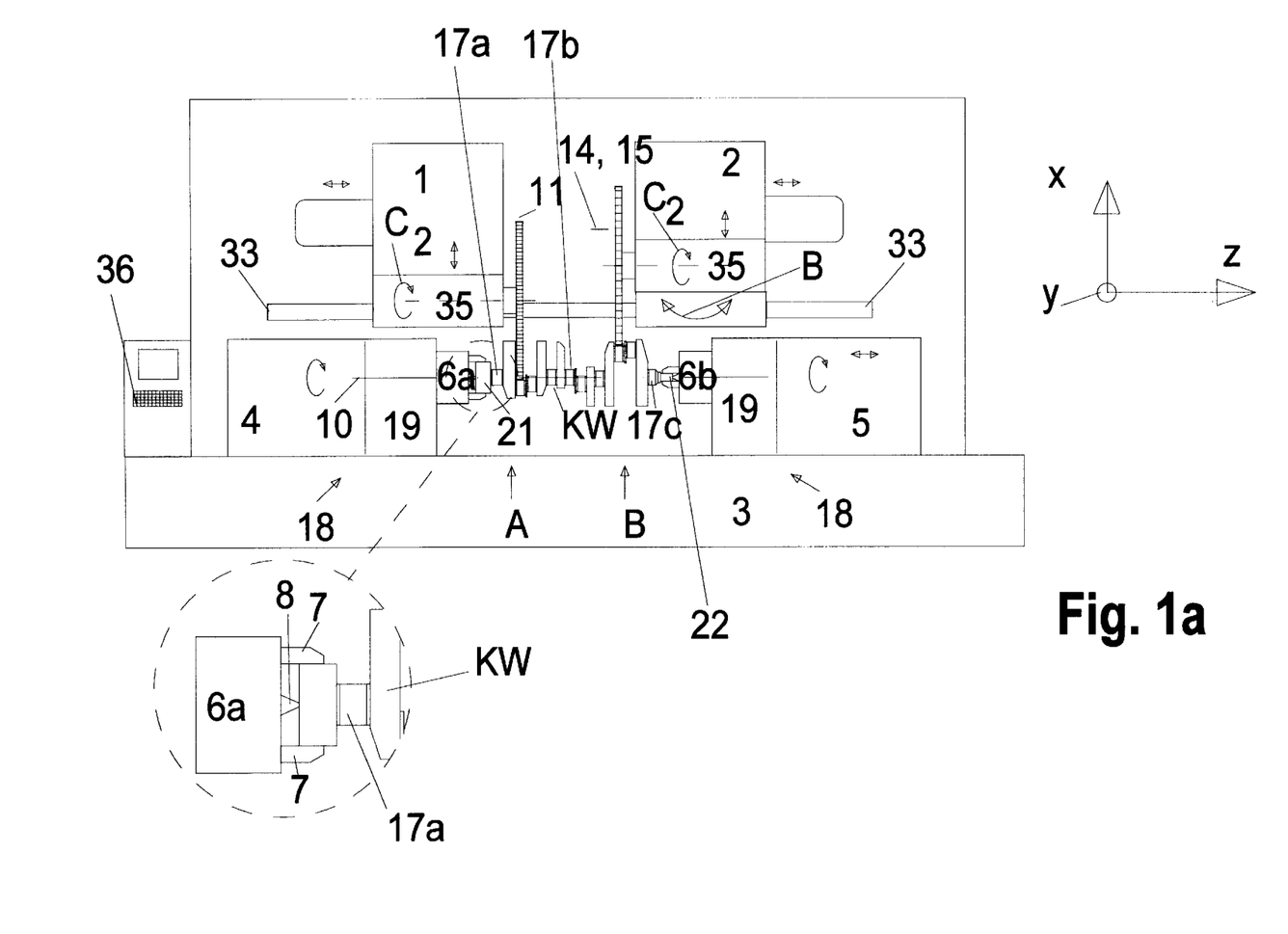
FIG. 1a is a side view of a machine for cutting machining. by means of two machining units.
Figure 1B:
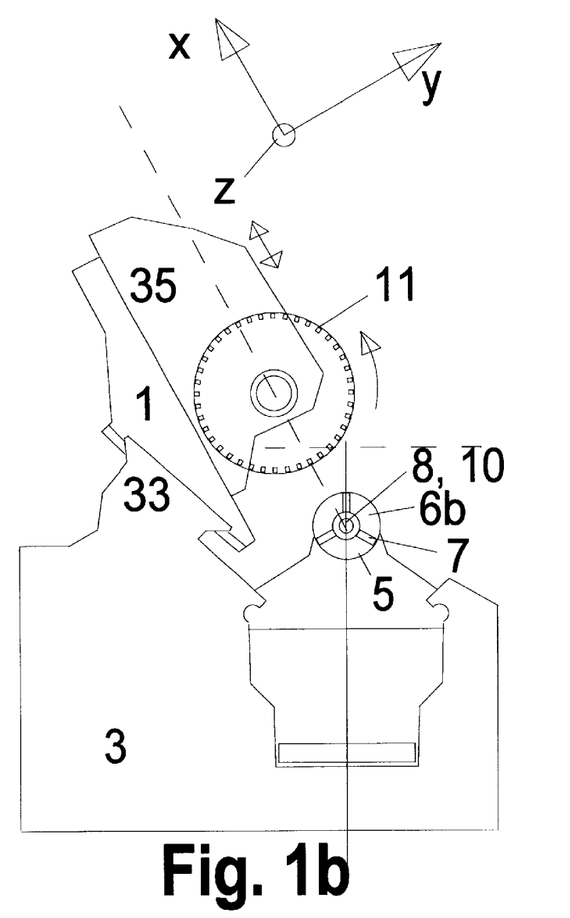
FIG. 1b is an end view of the FIG. 1a machine.

FIGS. 1a and 1b show an apparatus for the cutting machining of a workpiece shown as a crankshaft KW is a side view and an end view, respectively. The end view of FIG. 1b is in the direction of the longitudinal axis 10 of the crankshaft KW.

The view of FIG. 1a shows the bed 3 of the machine on which are arranged two spindle stocks 4, 5 of which the one spindle stock 5 is displaceable in the axial, Z-direction, in order to permit the crankshaft to be introduced and removed.

The crankshaft KW is clamped at each of its two ends in a respective chuck 6a, 6b carried on one of the spindle stocks 4, 5 and driven in rotation thereby. Reference 18 denotes a drive with a drive speed ranging for example from 0 to 1500 rpm. The spindle stocks 4, 5 are either electronically or mechanically synchronised or, instead of the one spindle stock 5, the machine only has a freely rotating tailstock without its own drive.

Two more more tool supports 1, 2 are displaceable along the bed parallel to the workpiece, along a Z-guide 33. The tool supports 1, 2 each carry a respective one or more tools. The one case involves a disk-shaped rotary milling tool 11 while the other case involves a disk-shaped rotational broaching tool 14 or turning-rotational broaching tool 15. The disk-shaped tools are respectively pivotable or drivable in rotation about a $C_2$-axis, in parallel relationship with the Z-direction, and are arranged on an X-carriage 35 which is displaceable in the X-direction, that is to say radially transversely with respect to the crankshaft, and which is arranged on the tool support 1, 2.

Figure 4:
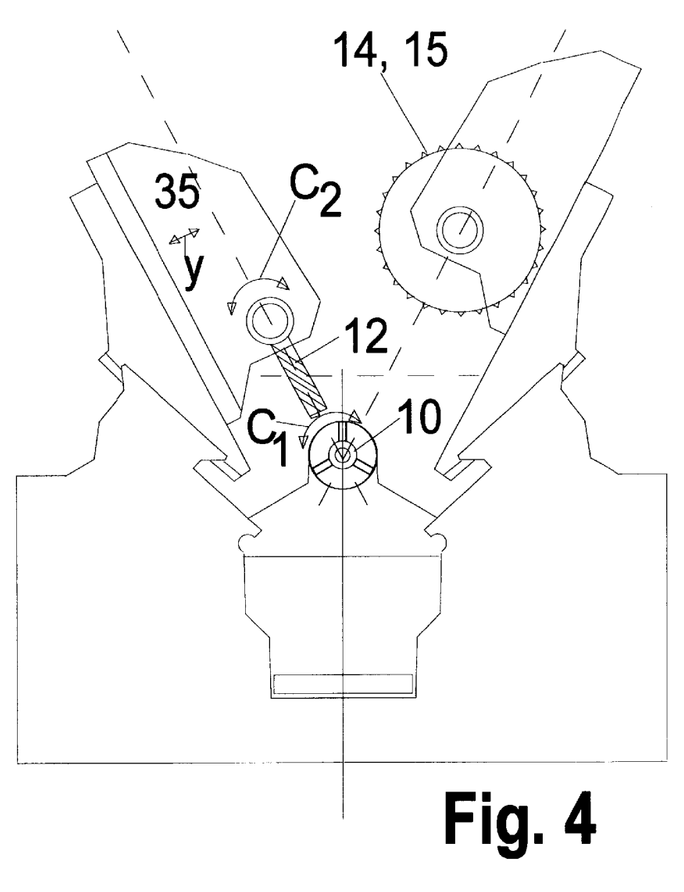
FIG. 4 is an end view of a machine which a modification of the machine of FIG. 2.

Additional displaceability of an orthogonal milling tool shown in FIG. 4 as the finger milling cutter 12 in the Y-direction affords further machining options.

As can be seen from the view in FIG. 1b, this can involve an inclined bed machine in which therefore the Z-guide is arranged approximately at the height of the longitudinal axis 10, and the X-carriage 35 is movable inclinedly from above towards the workpiece which is not shown in FIG. 1b, that is to say towards the longitudinal axis 10.

Figure 2:
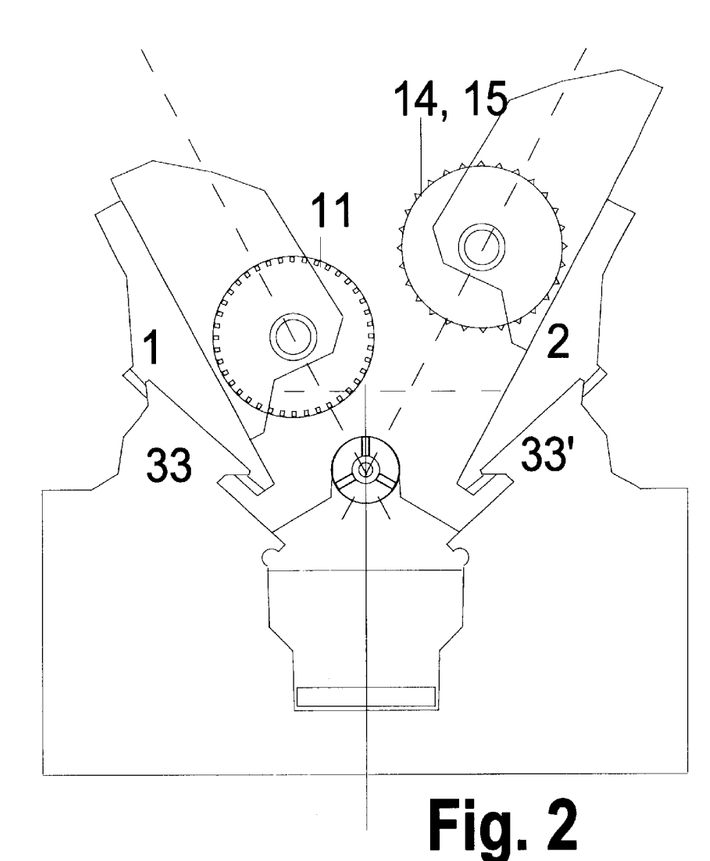
FIG. 2 is an end view of a similar machine.

While, in the embodiment shown in FIG. 1b, the two tool supports 1, 2 are arranged one behind the other in the direction of viewing FIG. 1b, FIG. 2 shows a view of a design configuration in which the bed 3 is of asymmetrical structure and the two tool supports 1, 2 are arranged in a V-shape in such a way that their X-carriages are displaceable at a preferably acute angle relative to each other towards the longitudinal axis 10 of the machine.

The view of FIG. 1a shows the rotary milling tool 11 and the rotational broaching tool 14 in simultaneous use, which in practice is thought to be a rather rare situation.

It will be apparent that preferably crank throw or big-end bearings are machined by means of the rotary milling tool 11. The rotary milling tool 11 must therefore be of such a diameter and must project radially in the X-direction beyond its X-carriage 35 which carries it, to such an extent that machining of the big-end bearings is possible, without collision, in spite of the crank side cheek portions which project further beyond the longitudinal axis 10. The crank side cheek end faces and possibly crank side cheek peripheral surfaces are preferably also machined by means of the rotary milling cutter 11.

In that case the crankshaft KW is stationary (preferably with only radial inward engagement of the rotary milling tool 11) or it rotates slowly (with tangential inward engagement of the tool) through at least one full revolution until the crank throw journal 16, possibly including its mirror surfaces forming thrust surfaces, and the adjoining crank side cheek end faces, have been finished machined. For this to occur knowledge of the rotational position of the crankshaft KW is necessary. That is, there is a need for a controlled C-axis with respect to the spindle stock or stocks 4, 5 and a defined rotational position of the crankshaft KW with respect to the chucks 6a, 6b.

In contrast, the rotational broaching tool 14 or turning-rotational broaching tool 15 machines the central or main bearings, possibly also including the oil shoulders, mirror or thrust surfaces and so forth. In that situation the crankshaft KW is driven in rotation very fast without the precise rotational position having to be known while the rotational broaching tool 14 or 15 is rotated or pivoted relatively slowly parallel to the crankshaft or does not rotate at all while a plunge-cut rotational machining operation is effected only with one cutting edge of the tool. A machine control system 36 co-ordinates the Z- and X-movements of the tools, the rotary movements or pivotal movements of the tools and possibly the speed of rotation or possibly also the angular position of the crankshaft KW.

In order to be able to perform finishing machining on a rough crankshaft with such a machine, as far as possible in a single clamping configuration, that is to say in order also to be able to machine the end flange 21 and the end journal 22, special chucks 6a, 6b are used, as illustrated in the detail view on an enlarged scale in FIG. 1a:

Those chucks can on the one hand each have a respective central point or center 8, by means of which the workpiece can be gripped between centers in known manner by engaging into a centering bore in the face thereof.

In addition this chuck has in particular retractable jaws 7 which floatingly or centeringly grip the workpiece KW at an outside periphery.

For machining the rough, forged or cast crankshaft which, as preliminary machining only has the above-mentioned centering bores, the crankshaft is first, accommodated at the ends between the points 8 and torque is applied. In that particular clamping configuration, one of the central bearings at the longitudinal center, for example 17b, is machined by means of turning, rotational broaching or turning-rotational broaching, at the periphery. That first machined location then serves for applying a support device, linette or the like, by way of which the crankshaft can also be driven in rotation in a manner not shown herein. With this support/drive arrangement, it is now possible with the present tools to machine the end flange 21 and the end journal 22 at the periphery and possibly also at the outwardly disposed end face, into the proximity of the centering bore. The crankshaft can then be clamped at those machined peripheral surfaces of the end flange 21 and the end journal 22 by means of the jaws 7 and the crankshaft can be machined at all other desired locations.

For that purpose, the jaws 7 preferably floatingly or centeringly engage the periphery of the end flange 21 or the end journal 22, without the clamping action between the centers or points 8 having to be completely removed either beforehand or at the same time to release the crankshaft, in order not to give rise to a positional error of the crankshaft KW with respect to the chucks 6a, 6b.

For this to occur, the jaws 7 are displaceable in the axial Z-direction relative to the points 8 and in particular are retractable with respect to the points 8 to such an extent that no collision can occur when machining the ends of the crankshaft.

Figure 3:
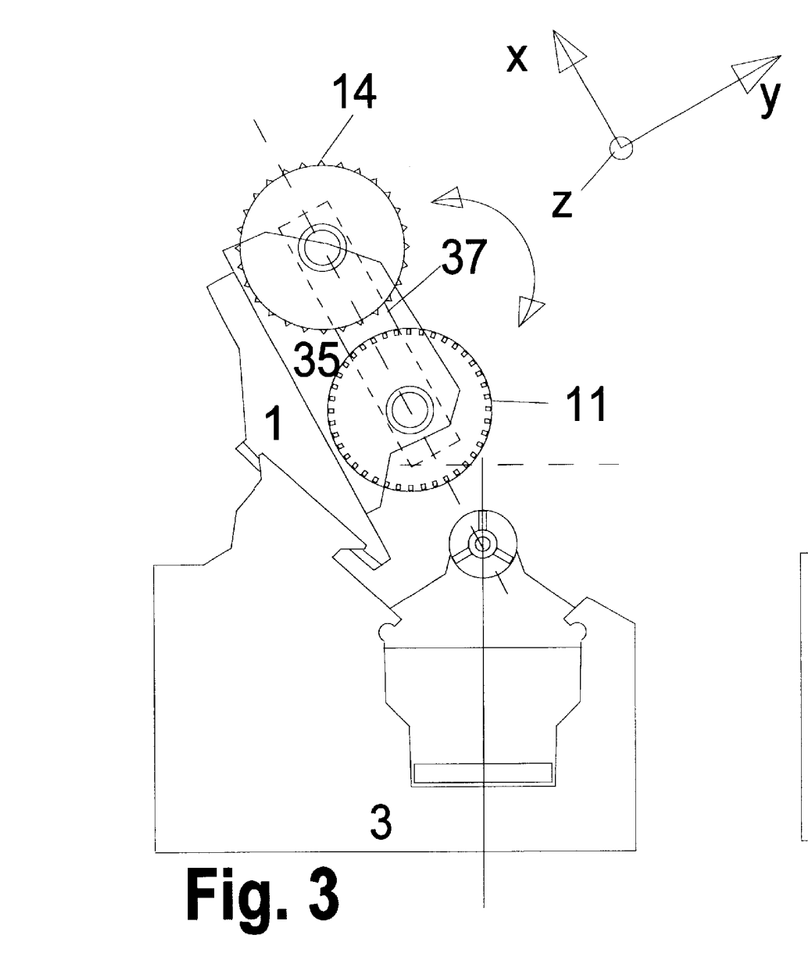
FIG. 3 is an end view of a modification of the machine shown in FIGS. 1a and 1b.

In comparison, FIG. 3 shows a view of a design configuration of a machine in which two disk-shaped tools, more specifically, on the one hand an external milling tool 11 and, on the other hand, a rotational broaching tool 14 are disposed on 8 pivotal carrier 37, on a single tool support 1 which is displaceable in the Z-direction. The pivotal carrier 37 is in turn positioned on the X-carriage 35. On the basis of the consideration that, at the completely different necessary speeds of rotation of the workpiece when carrying out external milling or rotary milling on the one hand and when carrying out turning or rotational broaching or turning-rotational broaching on the other hand, the two tools generally cannot come into operation on the workpiece at the same time so that the arrangement on a common tool support saves on the structure for a second support and provides space for further machining units.

In this case also the X-carriage is displaceably inclined downward towards the workpiece and the workpiece is disposed above the chip and cuttings trough which is formed in the machine bed 3.

FIG. 4 shows a structure similar to FIG. 2, but in which the external milling tool 11 is replaced by a finger milling cutter 12. The latter is generally not rotatable on the X-carriage 35 but is only pivotable about a $C_2$-axis arranged parallel to the Y-axis 10, in order to permit tracking adjustment of the end face of the finger milling cutter 12 on which the single end cutting edge is shown, with the crank throw bearing journals of the rotating crankshaft.

As an alternative, it is also possible for the tool, that is to say for example the finger milling cutter 12, instead of the pivotal movement, also to be arranged on the tool support movably in the second transverse direction with respect to the longitudinal axis of the workpiece, being the Y-direction, and it is thus possible to achieve controlled superimposition of the X- and Y-movements in the adjustment procedure in regard to the workpiece to be machined.

The finger milling cutter 12 machines, with its end cutting edges, a peripheral surface of the workpiece. When using only a single end cutting edge which extends radially outwardly from the center of the finger milling cutter, particularly good surfaces are produced on the machined workpiece.

The generally helical cutting edges on the peripheral surface of the finger milling cutter serve for machining end faces on the workpiece, for example, crank side cheek faces.

Figure 5:
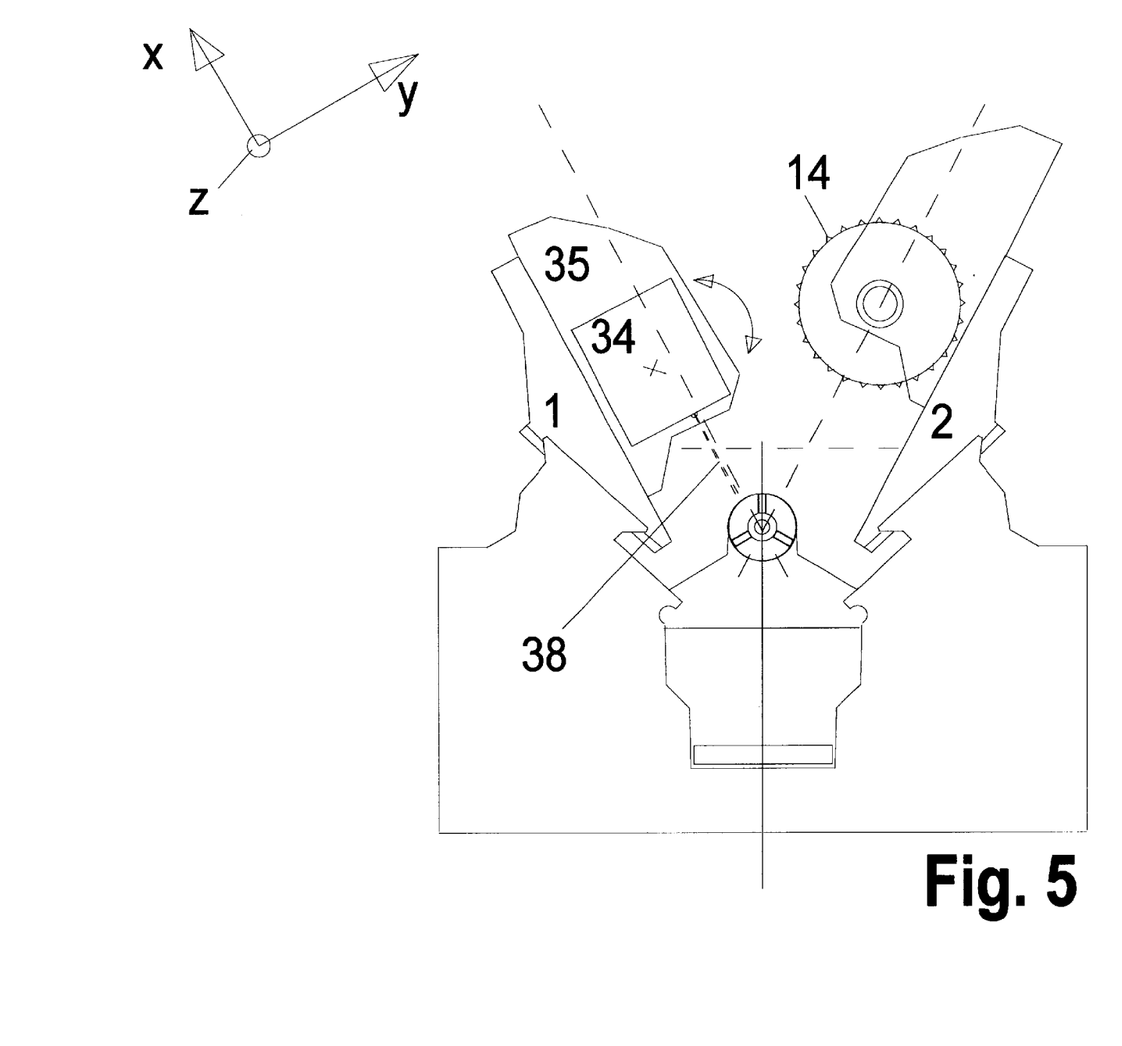
FIG. 5 shows an end view of another modification of the machine shown in FIGS. 1a, and 1b.

FIG. 5 is a view of a machine which, in terms of its structure, corresponds to that shown in FIG. 2 or FIG. 4. Arranged on the tool support 1 however instead of a cutting tool is a non-chip-cutting machining unit which once again, relative to the tool support, in particular the X-carriage 35 thereof, is either pivotable about an axis extending in the Z-direction or is additionally controlledly displaceable in the Y-direction.

For those times when such a non-cutting machining unit is involved, such as, for example, a laser cutting unit, a laser hardening unit or a water jet cutting unit, an issuing jet 38 is symbolically illustrated in the drawing. With adequate focusing of the jet, the non-cutting machining unit 34 during operation on the workpiece, can be so far away that it is possible, even with the tool supports 1 and 2 being arranged in the V-shape as shown in FIG. 5, for the tool, for example, a rotational broaching tool 14, of the other support 2, to operate at the same machining location without any fear of collisions occurring.

Figure 6:
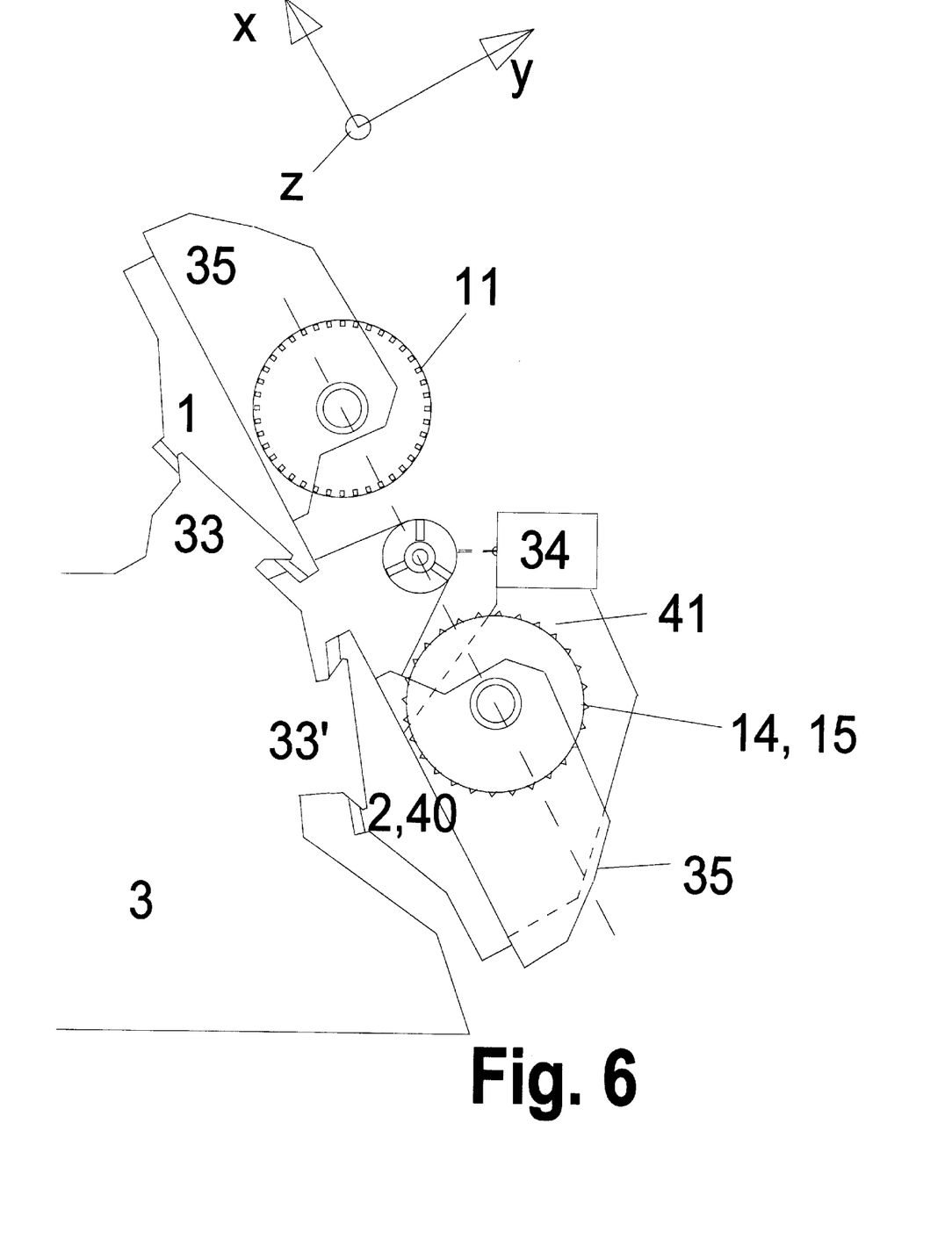
FIG. 6 shows an end view of another machine embodiment.

In comparison, FIG. 6 shows a machine in which two tool supports 1, 2 are arranged on mutually opposite sides of the workpiece, and their X-carriages 35 are displaceable preferably in the same X-plane relative to each other towards the workpiece which is not shown in FIG. 6, that is, towards the longitudinal axis 10 of the machine.

In that case, as described with reference to FIGS. 1 and 2, the supports 1 and 2 carry on the one hand, a rotatable disk-shaped rotary milling tool 11 and, on the other hand, a rotatable or pivotable, disk-shaped rotational broaching tool 14 or turning-rotational broaching tool 15 respectively. Additionally, in FIG. 6 a further tool support 40 is displaceable on one of the two Z-guides 33, 33' of the bed 3. The further tool support 40 carries a non-cutting machining unit 34 which has already been described hereinbefore with reference to FIG. 5. The noncutting machining unit 34 is, in this case, also pivotable with respect to the X-carriage 41 carrying it about an axis parallel to the Z-direction or it is displaceable controlledly in the Y-direction, that is, transversely with respect to the direction of movement of the X-carriage and transversely with respect to the longitudinal axis 10.

It will be apparent that the above-described method and apparatus according to the invention have been set forth solely by way of example and that various other modifications and alterations may be made therein without departing from the spirit and scope of the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of cutting machining a workrpiece with rotationally symmetric surfaces, comprising the steps of:
    a first cutting machining operation in which a first cutting speed is produced primarily by rotation of the workpiece; and
    a second cutting machining operation in which a second cutting speed is produced primarily by rotation of a tool;
    wherein the workpiece is a crankshaft having an end flange and an end journal, and at least one of the end flange and the end journal is also machined within a same working procedure without removal from a machine which implements machining of remaining regions of the workpiece;
    wherein when the crankshaft is held between two points a central bearing is cutting machined by means of at least one of turning and rotational broaching and turning-rotational broaching at a periphery of the central bearing;
    wherein additional support for the crankshaft is effected at the machined central bearing and wherein cutting machining of at least one of the end flange and the end journal is effected at least at peripheral surfaces thereof by at least one of turn and rotational broaching and turning-rotational broaching,
    clamping of the crankshaft is effected at the machined peripheral surfaces of the end flange and the end journal;
    machining of the central bearings at least at the peripheral surface is effected by at least one of turning and rotational broaching and turning-rotational broaching, and
    machining of crank throw bearings at least at one of the periphery and crank side cheek end faces is effected by at least one of external milling and rotary milling.

2. The method according to claim 1, wherein the cutting machining of the workpiece is provided both by means of at least one of an external milling and rotary milling, and also by means of at least one of turning and rotational broaching and turning-rotational broaching.

3. The method according to claim 2, wherein the external milling is high-speed milling.

4. The method according to claim 2, wherein the cutting machining of the workpiece is provided by means of rotary milling.

5. The method according to claim 4, wherein the milling is high-speed rotary milling.

6. The method according to claim 1, wherein both said first cutting machining operation and said second cutting machining operation are effected in one clamping configuration.

7. The method according to claim 1, wherein at least one of said first and second cutting machining operation of the workpiece is effected simultaneously at a plurality of locations.

8. The method according to claim 1, wherein at least one of first and second cutting machining operation is accomplished by turning rotational broaching or turning-rotational broaching which is effected after hardening of the workpiece.

9. The method according to claim 1, wherein hardening is effected while the workpiece is clamped in a machine without removing the workpiece from the machine.

10. The method according to claim 9, wherein hardening is effected by means of laser.

11. The method according to claim 9, wherein hardening is effected by means of an inductor.

12. The method according to claim 1, including the farther step of targeted removal of material effected by means of a laser beam.

13. The method according to claim 1, including the farther step of targeted removal of material effected by means of water jet.

14. The method according to claim 1, wherein milling is effected at high speed.

15. The method according to claim 1, wherein said cutting machining includes cutting machining of at least one of said end flange and said end journal is effected simultaneously with said support for the crankshaft.

16. The method according to claim 15, wherein, prior to applying the clamping action at the peripheral surfaces of at lest one of the end flange and the end journal, a mounting between mounting points is at least partially released to release the crankshaft.

* * * * *